US012634319B2

(12) United States Patent
Kelly et al.

(10) Patent No.: US 12,634,319 B2
(45) Date of Patent: May 19, 2026

(54) USING CACHED NETWORK DATA ON A DEVICE TO DISCOVER UNSCANNABLE DEVICES

(71) Applicant: Rapid7, Inc., Boston, MA (US)

(72) Inventors: Emmett Kelly, Belfast (GB); Ross Kirk, Belfast (GB)

(73) Assignee: Rapid7, Inc., Boston, MA (US)

( * ) Notice: Subject to any disclaimer, the term of this patent is extended or adjusted under 35 U.S.C. 154(b) by 76 days.

(21) Appl. No.: 18/883,288

(22) Filed: Sep. 12, 2024

(65) Prior Publication Data

US 2025/0007939 A1     Jan. 2, 2025

Related U.S. Application Data

(63) Continuation of application No. 17/682,262, filed on Feb. 28, 2022, now Pat. No. 12,120,138.

(51) Int. Cl.
| | |
|---|---|
| *H04L 29/06* | (2006.01) |
| *G06F 9/54* | (2006.01) |
| *H04L 9/40* | (2022.01) |
| *H04W 64/00* | (2009.01) |

(52) U.S. Cl.
CPC .......... *H04L 63/1425* (2013.01); *G06F 9/547* (2013.01); *H04L 63/02* (2013.01); *H04W 64/00* (2013.01)

(58) Field of Classification Search
CPC ..... H04L 63/1425; H04L 63/02; G06F 9/547; G06F 9/541; H04W 64/00
See application file for complete search history.

(56) References Cited

U.S. PATENT DOCUMENTS

| | | | | |
|---|---|---|---|---|
| 6,647,412 | B1 * | 11/2003 | Strandberg | .............. H04L 47/20 709/224 |
| 11,032,124 | B1 | 6/2021 | Haddow et al. | |
| 11,089,490 | B1 | 8/2021 | Ta et al. | |
| 11,533,335 | B2 * | 12/2022 | Hale | ................... H04L 63/1466 |
| 2006/0271934 | A1 | 11/2006 | Ezaki | |
| 2008/0304427 | A1 * | 12/2008 | Biswas | ................... H04L 41/04 370/255 |
| 2009/0325569 | A1 | 12/2009 | Chou | |
| 2011/0009135 | A1 | 1/2011 | Roskowski et al. | |

(Continued)

OTHER PUBLICATIONS

Tundis, Andrea, Wojciech Mazurczyk, and Max Mühlhäuser. "A review of network vulnerabilities scanning tools: Types, capabilities and functioning." Proceedings of the 13th international conference on availability, reliability and security. 2018. (Year: 2018).*

*Primary Examiner* — Ka Shan Choy
(74) *Attorney, Agent, or Firm* — Ashwin Anand

(57) ABSTRACT

A software agent executing on a computing device receives a request from a client to provide data associated with neighboring devices to the computing device. The client includes a scan engine to perform a network scan of a network that includes the computing device. The software agent accesses device data in a cache of an operating system command, determines, based on the device data, an identifier associated with each device that is neighboring the computing device, converts the device data into a standardized format to create neighboring device data, and sends the neighboring device data to the client.

20 Claims, 4 Drawing Sheets

300

RECEIVE (E.G., VIA AN API ENDPOINT) A REQUEST TO PROVIDE NEIGHBORING DEVICE DATA
302

READ CACHE DATA ASSOCIATED WITH A COMMAND (E.G., ARP, NDP, OR SIMILAR)
304

DETERMINE DEVICE DATA (E.G., MAC ADDRESS, IP ADDRESS, AND THE LIKE) OF NEIGHBORING DEVICES FROM THE CACHE DATA
306

CONVERT THE DEVICE DATA INTO A STANDARDIZED FORMAT TO CREATE NEIGHBORING DEVICE DATA
308

SEND THE NEIGHBORING DEVICE DATA AS A RESPONSE TO THE REQUEST
310

(56) References Cited

U.S. PATENT DOCUMENTS

| | | | |
|---|---|---|---|
| 2013/0148573 A1* | 6/2013 | Boland | ................. H04W 8/005 |
| | | | 370/328 |
| 2017/0187574 A1 | 6/2017 | Subramanian et al. | |
| 2019/0261191 A1 | 8/2019 | Nakano et al. | |
| 2023/0032366 A1 | 2/2023 | Lee et al. | |

* cited by examiner

200

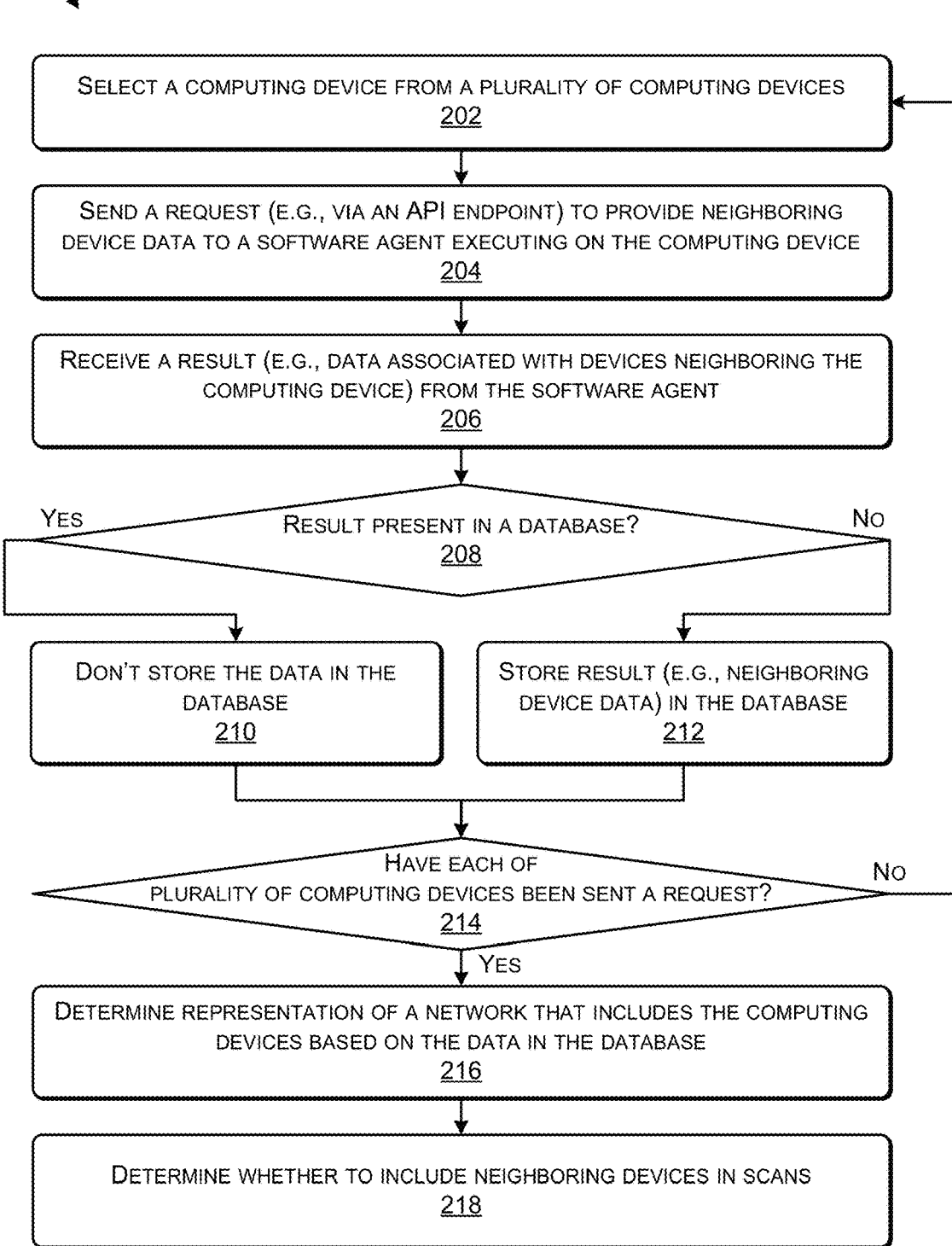

SELECT A COMPUTING DEVICE FROM A PLURALITY OF COMPUTING DEVICES
202

SEND A REQUEST (E.G., VIA AN API ENDPOINT) TO PROVIDE NEIGHBORING DEVICE DATA TO A SOFTWARE AGENT EXECUTING ON THE COMPUTING DEVICE
204

RECEIVE A RESULT (E.G., DATA ASSOCIATED WITH DEVICES NEIGHBORING THE COMPUTING DEVICE) FROM THE SOFTWARE AGENT
206

RESULT PRESENT IN A DATABASE?
208

YES                                                                    NO

DON'T STORE THE DATA IN THE DATABASE
210

STORE RESULT (E.G., NEIGHBORING DEVICE DATA) IN THE DATABASE
212

HAVE EACH OF PLURALITY OF COMPUTING DEVICES BEEN SENT A REQUEST?
214

No

YES

DETERMINE REPRESENTATION OF A NETWORK THAT INCLUDES THE COMPUTING DEVICES BASED ON THE DATA IN THE DATABASE
216

DETERMINE WHETHER TO INCLUDE NEIGHBORING DEVICES IN SCANS
218

FIG. 2

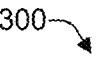

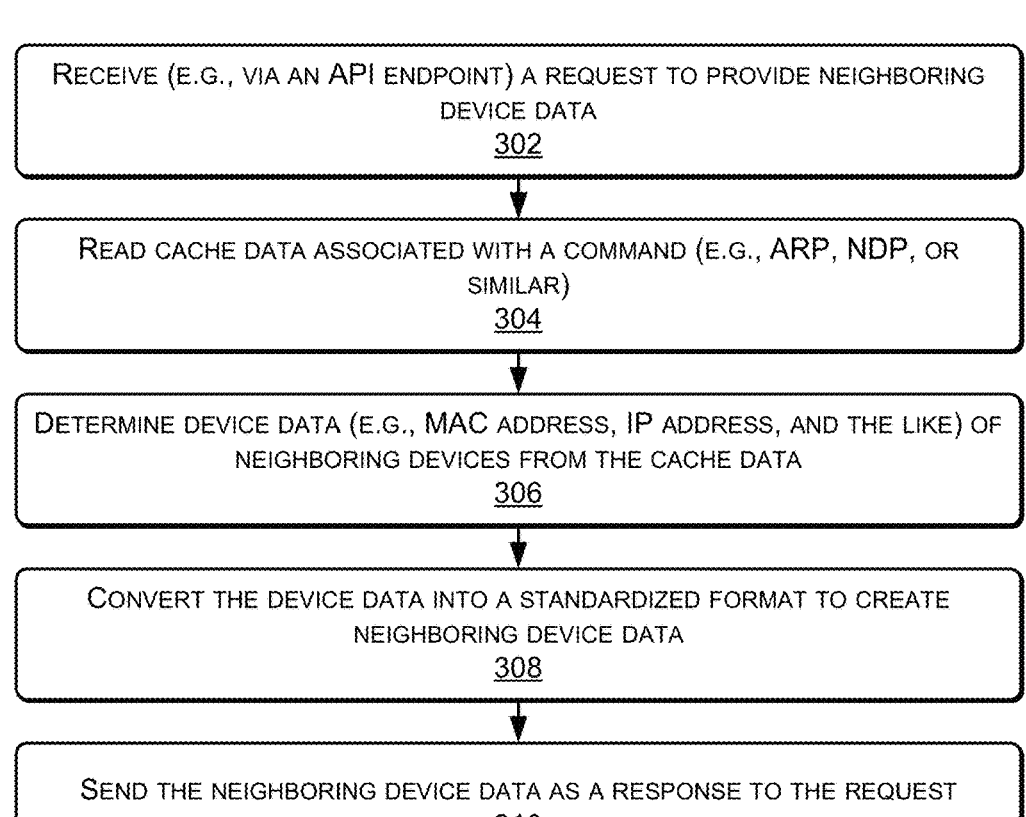

300

RECEIVE (E.G., VIA AN API ENDPOINT) A REQUEST TO PROVIDE NEIGHBORING DEVICE DATA
302

READ CACHE DATA ASSOCIATED WITH A COMMAND (E.G., ARP, NDP, OR SIMILAR)
304

DETERMINE DEVICE DATA (E.G., MAC ADDRESS, IP ADDRESS, AND THE LIKE) OF NEIGHBORING DEVICES FROM THE CACHE DATA
306

CONVERT THE DEVICE DATA INTO A STANDARDIZED FORMAT TO CREATE NEIGHBORING DEVICE DATA
308

SEND THE NEIGHBORING DEVICE DATA AS A RESPONSE TO THE REQUEST
310

FIG. 3

USING CACHED NETWORK DATA ON A DEVICE TO DISCOVER UNSCANNABLE DEVICES

CROSS-REFERENCE TO RELATED APPLICATIONS

This application is a continuation of and claims priority to U.S. patent application Ser. No. 17/682,262, filed Feb. 28, 2022, which is hereby incorporated by reference in its entirety.

BACKGROUND

Many companies operate private computer networks that are connected to public networks such as the Internet. While such connections allow company users to easily access resources on the public networks, they also create vulnerabilities in the company network. For example, company users may unwittingly download malicious content (e.g., data, files, applications, programs, etc.) onto the company network from untrusted sources on the Internet. As another example, interactions of company users with the public network may provide opportunities for malicious actors to attack the company network. A malicious actor can plant spyware, viruses, or other types of malicious software in a company's private network though a variety of interactive means, in order to steal sensitive information from the company or even gain control of the company's computing systems. As a result, enterprise security systems have become increasingly important to protect company networks against these types of vulnerabilities.

Some enterprise security systems operate by periodically collecting data from computing resources in the company network, in order to monitor these resources. Unfortunately, large scale configuration and management of these data collections continues to present significant challenges. Typically, data collection requirements for a resource does not remain static over time. For example, additional data may be needed for a particular machine to perform a more specific assessment of that machine, based on the results of an earlier assessment. It is generally difficult to know in advance what data is needed from a machine to perform an ongoing comprehensive assessment of that machine. Over-collection of data from the machine is undesirable as it places excessive strain on the collection pipeline. On the other hand, under-collection of data is also undesirable since it prevents the assessment system from properly monitoring the machine.

When a scan engine (e.g., network scanner) is performing a scan of individual devices in a network (e.g., to identify vulnerabilities, failure to comply with enterprise policies, and the like), the scan engine may not scan every device in the network. A number of factors may prevent the scan engine from scanning or even detecting each device in the network. For example, an enterprise may specify addresses of devices in the network that are to be scanned and may not include addresses of all the devices in the network. In some cases, the enterprise may be unaware of additional devices in the network. As another example, some device firewalls may be configured to not respond to a network scan. In some cases, intermediary firewalls may prevent a network scanner from reaching one or more devices. However, if the scan engine is scanning devices in a network for security vulnerabilities and the scan engine is unaware of some of the devices in the network, the network could be vulnerable to unauthorized access via the unscanned devices.

SUMMARY OF THE DISCLOSURE

This Summary provides a simplified form of concepts that are further described below in the Detailed Description. This Summary is not intended to identify key or essential features and should therefore not be used for determining or limiting the scope of the claimed subject matter.

In some examples, a software agent executing on a computing device receives a request from a client to provide data associated with neighboring devices to the computing device. The client includes a scan engine to perform a network scan of a network that includes the computing device. The software agent accesses device data in a cache of an operating system command, determines, based on the device data, at least one identifier associated with each device that is neighboring the computing device, converts the device data into a standardized format to create neighboring device data, and sends the neighboring device data to the client.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 2 is a flowchart of a process 200 that includes a client sending a request to a computing device to provide neighboring device data, according to some embodiments.

FIG. 3 is a flowchart of a process that includes a computing device receiving a request from a client to provide neighboring device data, according to some embodiments.

DETAILED DESCRIPTION

Figure 1:
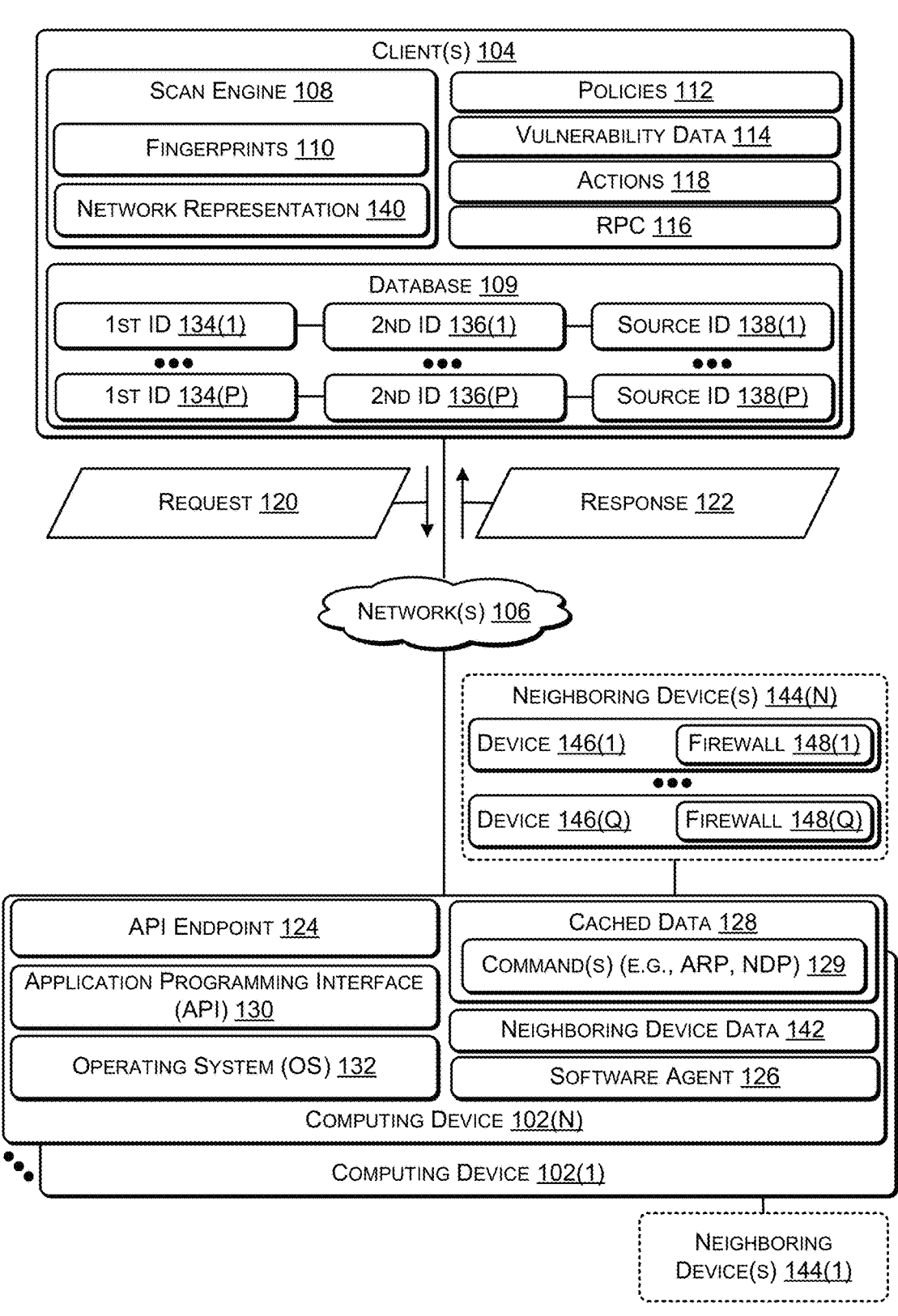
FIG. 1 is a block diagram of a system that includes a client hosting a scan engine to scan one or more computing devices for policy compliance and vulnerabilities, according to some embodiments.

The systems and techniques described herein a scan engine to discover all devices on a network, even those the scan engine is currently not scanning. The owner of the network may be notified of the devices that are not currently being scanned and asked whether the devices are to be scanned.

The systems and techniques use a service (e.g., a software agent or similar) installed on individual network devices in a network to provide information about the neighbors of the individual network devices. The service provides an application programming interface (API) endpoint that allows an application, such as a scan engine, to request information about neighbors of the individual devices. The service uses an operating system protocol associated with an operating system installed on the individual devices to determine information associated with devices neighboring the individual devices. For example, the operating system protocol may include Address Resolution Protocol (ARP), Neighbor Discovery Protocol (NDP), Internet Protocol (IP) Neighbor command, another command to obtain neighboring device information, or any combination thereof. The cache associated with executing ARP, NDP, or the like is used to determine a set of neighboring devices associated with each device being scanned. The set of neighboring devices is provided to the network scanner in response to the API request for neighbor information. In this way, the scan engine can determine the existence of neighboring devices even if the scan engine is not able to directly connect to the neighboring devices themselves.

Thus, an application, such as a scan engine, executing on a client is able to identify neighboring devices of the devices in a network that the scan engine is scanning using ARP/NDP caches (or similar). Each device in the network that the scan engine is scanning may have a software agent installed to provide the scan engine with data associated with each device. The software agent installed on a particular device responds to requests from the scan engine to provide information about the particular device, such as, for example, user data (e.g., usernames and corresponding permissions), file data (e.g., file names, file contents, file metadata, and the like), group data (e.g., group names, group members, group permissions, and the like), currently installed software applications, and other types of device-related information.

After the scan engine determines that a device that is being scanned has a software agent installed on the device, the scan engine sends a request to the software agent to provide information about the device's neighbors. The software agent interacts with the device's operating system (e.g., Windows®, MacOS®, Linux®, or the like) to collect data about the device's neighbors. For example, the software agent may use the ARP/NDP caches or similar to determine the device's neighbors. The software agent provides neighboring device data (e.g., in response to the scan engine's request for neighboring device data).

Depending on the operating system, the software agent installed on the device can obtain the neighboring device data from the ARP/NDP caches in several different ways. For example, when the operating system is Linux®, the ARP information may be collected by reading from "/proc/net/arp".

As another example, when the operating system is Windows®, the neighboring device data may be collected using the GetIPNetTable2 API provided in Netioapi.h.

The software agent obtains the neighboring device data and modifies the neighboring device data into a standardized format (e.g., the format of the modified neighboring device data is the same, regardless of whether the operating system is Windows®, MacOS®, Linux®, or another operating system. The software agent sends the modified neighboring device data (e.g., in the standardized format) to the scan engine. For example, the neighboring device data may include a hardware address (e.g., media access control (MAC) address) and a software address (e.g., Internet Protocol (IP) address) associated with each neighboring device.

Thus, the systems and techniques described herein enable the discovery of data (e.g., MAC address, IP address, and the like) associated with devices that may previously have been invisible to network scanning tools, such as a scan engine. This improved visibility into existing network devices can help network scanning tools provide a more complete view of a network environment. For example, the devices that are present in the network but are currently not being scanned may enable unauthorized access to the network. By discovering the unscanned devices in the network and alerting a network administrator, the scan engine may be instructed to scan the previously unscanned devices to increase security in the network and reduce the possibility of unauthorized access to the network.

As an example, a software agent executing on a computing device receives a request from a client to provide data associated with neighboring devices. For example, the software agent may receive the request from the client to provide the data associated with the neighboring devices via an application programming interface (API) endpoint. The client includes a scan engine to perform a network scan of a network that includes the computing device. The software agent accesses device data in a cache of an operating system command. For example, the operating system command may be a Neighbor Discovery Protocol (NDP) command or an Address Resolution Protocol (ARP) command. The software agent determines, based on the device data, at least one identifier associated with each device that is neighboring the computing device. For example, the at least one identifier may include a media access control (MAC) address or an internet protocol (IP) address. The software agent converts the device data into a standardized format to create neighboring device data. The software agent sends the neighboring device data to the client. For example, at least one device that is neighboring the computing device may include a device firewall that is configured to not respond to the network scan. As another example, an intermediary firewall may prevent the network scan from reaching the at least one device that is neighboring the computing device. As a further example, the network scan may not be configured to scan an address associated with the at least one device that is neighboring the computing device.

FIG. 1 is a block diagram of a system 100 that includes a client hosting a scan engine to scan one or more computing devices for policy compliance and vulnerabilities, according to some embodiments. The system 100 includes multiple computing devices 102(1) to 102(N) (N>0, collectively referred to as the computing devices 102) connected to at least one client 104 via at least one network 106 (e.g., the network 106 may include a local area network (LAN), a wide area network (WAN), and the like). The computing devices 102 may include hardware devices, virtual machines (VMs), or any combination thereof.

The client 104 includes a scan engine 108 that determines and stores fingerprints 110 associated with the computing devices 102. Each of the fingerprints 110 may represent a particular state corresponding to each of the computing devices 102. The scan engine 108 may detect an anomaly when a current fingerprint differs more than a predetermined amount from a previously determined fingerprint from a particular computing device of the computing devices 102. After determining that a particular computing device has an anomaly, the scan engine 108 may perform a more detailed analysis to determine whether the particular computing device (1) has been tampered with by an unauthorized user, (2) includes a virus, or the like.

The client 104 may include policies 112. For example, the policies 112 may include policies created by a owner of the system 100. The client 104 may include data associated with potential vulnerability data 114. The scan engine 108 may scan each particular computing device of the computing devices 102 to determine a current fingerprint and compare the current fingerprint with one or more previous fingerprints, with an expected fingerprint, or both. If the comparison indicates that the current fingerprint differs from a previous fingerprint (or an expected fingerprint) by more than a threshold amount, then the scan engine 108 may determine that the particular computing device includes a vulnerability or is in violation of a policy.

The client 104 may include actions 118. The actions 118 may specify actions to be performed by the client 104, the computing devices 102, or a combination of both to address a breach of the policies 112 or a discovery of one of the vulnerability data 114. For example, the actions 118 may include sending a notification to a system administrator indicating that a particular computing device may include a vulnerability or may be non-compliant with a policy.

The scan engine 108 may use a remote procedure call (RPC) 116 to send a request 120 to one of the computing devices 102. For example, the request 120 may be sent to an application programming interface (API) endpoint 124 on individual computing devices of the computing devices 102. An API 130 is software code to enable two software programs (e.g., a software program on the client 104 and a software program on individual computing devices 102) to communicate with each other. The API endpoint 124 is a point at which the API 130 connects with one of the software programs. The API 130 enables a software application on the client 104 to send requests for information, such as the request 120, from the client 104 and to receive a response 122.

Each of the computing devices 102 may have the zero or more neighboring devices 144. For example, the computing device 102(1) may have zero or more neighboring devices 144(1) and the computing device 102(N) may have zero or more neighboring devices 144(N). To illustrate, the neighboring devices 144(N) may include a device 146(1) to a device 146(Q) (Q>=0). Each of the devices 146 may have a firewall. For example, the device 146(1) may have a firewall 148(1) and the device 146(Q) may have a firewall 148(Q). The neighboring devices 144(N) may not be scanned by the scan engine 108 for a variety of reasons. For example, the scan engine 108 may not scan the devices 146 because the scan engine 108 has not been instructed to scan the devices 146 (e.g., the scan engine 108 has not been provided with their addresses). As another example, the scan engine 108 may not scan the devices 146 because the firewalls 148 have been configured to not respond to scan requests from the scan engine 108. As yet another example, the scan engine 108 may not scan the devices 146 because the software agent 126 is not installed on each of the devices 146. Of course, there may be other reasons why the devices 146 are not currently being scanned by the scan engine 108.

Each of the computing devices 102 may include the API endpoint 124, a software agent 126, the API 130, and an operating system 132. The software agent 126 may receive the request 120 via the API endpoint 124. The request 120 may ask the software agent 126 to provide information associated with neighboring devices of the computing device 102(N). The software agent 126 may use an operating system 132 that is installed on the computing device 102(N) to determine the neighboring devices of the computing device 102(N). For example, the software agent 126 may examine cached data 128 associated with one or more commands 129, such as the Address Resolution Protocol (ARP) command, the NDP command, or the like. ARP is a Transmission Control Protocol/Internet Protocol (TCP/IP) command (in Windows®) for viewing and modifying a local Address Resolution Protocol (ARP) cache, which includes recently resolved media access control (MAC) addresses of Internet Protocol (IP) hosts on the network. The NDP program displays and modifies address translation tables used by IPV6 (Internet Protocol Version 6) neighbor discovery protocol. The software agent 126 retrieves information from the cached data 128 associated with the commands 129, formats the data into a standardized format, and stores the data as neighboring device data 142. The software agent 126 sends the neighboring device data 142 in the response 122 to the request 120. For example, the software agent 126 executing on the computing device 102(N) may receive the request 120, determine the neighboring devices 144(N) that neighbor the computing device 102(N), and send the neighboring device data 142 identifying the devices 146(1) to (Q) to the scan engine 108 in the response 122.

After receiving the response 122 that includes the neighboring device data 142, the scan engine 108 may store the neighboring device data 142 in the database 109. The neighboring device data 142 may include a first identifier 134, such as a hardware identifier (e.g., MAC address, serial number, service tag, or the like), associated with each of the neighboring devices 144. In some cases, the neighboring device data 142 may include a second identifier 136, such as a software identifier (e.g., IP address or the like). In some cases, the scan engine 108 may store the first identifier 134, the second identifier 136, or both along with a source identifier that identifies a source that provided the first identifier 134 and the second identifier 136. For example, after receiving the neighboring device data 142 from the software agent 126 installed on the computing device 102(N), the scan engine 108 may store the source identifier 138 (e.g., a hardware identifier, a software identifier, or both) associated with the computing device 102(N) to indicate that the neighboring device data 142 identifies neighbors of the computing device 102(N) that is identified by the source identifier 138. The database 109 may include multiple identifiers 134(1), 136(1) to 134(P), 136(P), where P>0. The source identifier 138 in the database 109 may enable the scan engine 108 to create a network representation 140 that includes the computing devices 102 along with the neighboring devices 144. The scan engine 108 may provide information about the devices identified by the identifiers 134, 136 in the database 109, e.g., devices that are present in the system 100 but are not currently scanned, to a system administrator or other authority. The scan engine 108 may request permission to scan these currently unscanned devices to reduce the possibility of an unauthorized actor gaining access to the devices in the system 100. For example, if the scan engine 108 performs scans of the computing devices 102 to determine compliance to one or more policies and to detect vulnerabilities, an unauthorized actor could potentially gain access to one or more of the computing devices 102 using one of the unscanned neighboring devices 144 of the computing devices 102. The scan engine 108 may request permission to scan the neighboring devices 144 to prevent an unauthorized actor from gaining access to one or more devices in the system 100.

After the scan engine 108 determines that the computing device 102(N) that is being scanned has the software agent 126 installed, the scan engine 108 sends the request 120 to the software agent 126 to provide information about the neighboring devices of the computing device 102(N). The software agent 126 interacts with the device's operating system 132 (e.g., Windows®, MacOS®, Linux®, or the like) to collect data about the neighboring devices 144(N). For example, the software agent 126 may use the cached data 128 of command 129 (e.g., ARP, NDP, or the like) to determine the data (e.g., MAC address and IP address) associated with the neighboring devices 144. The software agent 126 provides the neighboring device data 142 in the response 122 to the request 120 from the scan engine 108 to provide neighboring device data.

Depending on the operating system, the software agent 126 can obtain the neighboring device data from the ARP cache, the NDP cache, or the like in several different ways. For example, when the operating system is Linux®, the ARP information may be collected by reading from "/proc/net/arp":

TABLE 1

Result of executing "cat/proc/net/arp"

| IP Address | Hardware Type | Flags | Hardware Address | Mask | Device |
|---|---|---|---|---|---|
| 169.254.169.254 | 0 × 1 | 0 × 2 | 24:e9:b3:8d:41:c2 | * | eth0 |
| 172.17.0.2 | 0 × 1 | 0 × 2 | 02:42:ac:11:00:02 | * | docker0 |
| 10.5.3.1 | 0 × 1 | 0 × 2 | 24:e9:b3:8d:41:c2 | * | eth0 |
| 172.17.0.3 | 0 × 1 | 0 × 2 | 02:42:ac:11:00:03 | * | docker0 |
| 10.5.3.39 | 0 × 1 | 0 × 2 | 9c:93:4e:64:70:ec | * | eth0 |
| . . . | . . . | . . . | . . . | . . . | . . . |

As another example, when the operating system is Windows®, the neighboring device data may be collected using the GetIPNetTable2 API provided in Netioapi.h:

```
...
IPHLPAPI_DLL_LINKAGE _NETIOAPI_SUCCESS_
NETIOAPI_API GetIpNetTable2(
[in] ADDRESS_FAMILY Family,
[out] PMIB_IPNET_TABLE2 *Table
);
...
```

The software agent 126 obtains and modifies the cached data 128 into a standardized format, e.g., the format of the modified neighboring device data is the same, regardless of whether the operating system is Windows®, MacOS®, Linux®, or another operating system, that is stored as the neighboring device data 142. The software agent 142 sends the neighboring device data 142 (e.g., in the standardized format) to the scan engine 108. For example, the neighboring device data 142 may include a hardware address (e.g., MAC address, serial number, service tag, unique machine identifier, or the like) and a software address (e.g., IP address or the like) associated with each of the devices 146.

As shown, the system 100 includes the software agent 126 and the scan engine 108, which can communicate with each other over network 106. The software agent 126 may be installed and executing on a remote machine 102(N) to collect and report machine characteristics data of the remote machine to the scan engine 108. In some embodiments, the client 104 may be implemented as a cloud-based or network-accessible service, which is configured to receive machine characteristics data from a large number of different (e.g., N) agents and perform security vulnerability assessments on remote machines based on the received data. Each software agent 126 may be uniquely associated with a remote machine 102, and each software agent 126 may be assigned a unique agent ID that identifies the software agent 126 to the scan engine 108.

In some embodiments, the software agent 126 may be implemented as a lightweight software module on the individual computing devices 102. Different types of agents 120 may be implemented for different machine platforms, such as WINDOWS®, LINUX®, or MAC® machines. In some embodiments, the software agent 126 may be designed to run on a different computing system from a particular computing device that is being monitored. In that case, the software agent 126 may be configured to establish network connections to the particular computing device and collect machine characteristics data over these network connections.

In some embodiments, the software agent 126 may be configured to collect a set of machine characteristics of individual computing devices 102. The collected machine characteristics may include information that indicates the machine's operating system (OS) version, OS patches installed on the machine, installed applications and their version information, patches, settings, and metadata, files or file contents on the machine, and configuration data such as the machine's registry entries, security settings, usage data, etc., among other information.

In various embodiments, the network(s) 106 may encompass any suitable combination of networking hardware and protocols necessary to establish communications between the software agent 126 and the client 104. In some embodiments, the computing devices 102 may execute in a private network of a company, behind a company firewall, and the network 106 may include a public network such as the Internet, which lies outside the firewall. The network 106 may encompass the different telecommunications networks and service providers that collectively implement the Internet. In some embodiments, the network 106 may also include private networks such as private local area networks (LANs), private wide area networks (WANs), or private wireless networks. The network 106 may be implemented using different hardware (e.g., modems, routers, switches, load balancers, proxy servers, etc.) and software (e.g., protocol stacks, accounting software, firewall/security software, etc.) for establishing networking links between the computing devices 102 and the client 104.

As shown, data 142 about the computing devices 102 may be transmitted over the network 106 and received by the client 104. In some cases, the data included in the result 122 may be formatted as objects in JavaScript Objection Notation (JSON). The client 104 may receive result 122 from many agents 126 and perform a series of tasks to ingest the result 122. Such tasks may include authenticating the sender of the data, unpacking the incoming data, parsing and/or perform certain initial processing of the data, and storing the data in a local data repository. In some embodiments, where the result 122 is received from different customers or companies, the data included in the result 122 may be stored in an encrypted form.

The computing devices 102 may include different types of computing resources, such as a workstation, a server, a mobile device, a virtual machine, or the like. The virtual machine may be an instance of an emulated computer that is hosted on a physical virtual machine host. The virtual machine host may implement virtualization hardware and/or software (e.g., hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. As another example, another type of virtualized execution environment is the container, which provides a portable and isolated execution environment over a host operating system of a physical host. Example implementations of container technologies include DOCKER, GOOGLE KUBERNETES, AMAZON WEB SERVICES, and MICROSOFT AZURE. Each of these types of machines or execution environments may be monitored via the software agent 126. As may be appreciated, the software agent 126 may be implemented on other types of computing systems, including embedded systems, networking devices, storage devices, Internet-of-Things (IOT) devices, vehicles, and the like.

In some embodiments, the software agent 126 may collect different types of file metadata for particular files, including file size, file access time, file creation time, computed file hash values or checksums, etc. In some embodiments, the file permissions data that is collected on a WINDOWS machine may include a file's Discretionary Access Control List (DACL) for file access control and System Access Control List (SACL) for file access auditing. On a UNIX machine, collected file permission data may include a file's owner ID or name, group ID or name, mode (read/write/execute by world/group/owner), any special permission metadata on variants of UNIX platforms, and Access Control List (ACL) extensions on UNIX systems that support ACLs.

In some embodiments, the software agent 126 may be instructed to collect security configuration settings on the remote computing devices 102. For example, on a WINDOWS machine, such security configuration settings may include configuration settings found under WINDOWS Group Policy Objects for both local GPOs and domain GPOs, for those machines that members of a domain. For UNIX machines, the security configuration settings may include output of the sysctl system call executed on the machine; the firewall configuration, file system configuration, kernel configuration of the machine, and the configuration of one or more services such as Secure Shell (SSH).

In some embodiments, the software agent 126 may be instructed to collect the output of a program (e.g., a script) on the remote machine. In some embodiments, the agent may be configured to invoke programs or scripts in order to perform the data collection. The program may be for example a shell script, a bash script on a UNIX machine or a PowerShell script on a WINDOWS machine. Depending on the embodiments, script programs written in other programming languages may also be used to generate collected data.

In some embodiments, the software agent 126 ("agent") may be instructed to collect data by using a third-party library (e.g., a system library associated with the machine's operating system). Such third-party library may include, for example, kernel32.d11 on WINDOWS or libaudit on LINUX. These libraries may be invoked on the machine in different ways. In some embodiments, the library may be loaded within the agent's process memory and invoked directly by the agent. In some embodiments, the library may be loaded in an isolated child process of the agent and called by the child process for data collection purposes. In some embodiments, the library may be called outside of the agent's memory as an external process (e.g., for a separate application). In some embodiments, the separate application may be one that is compiled by the agent for data collection purposes. In some embodiments, the separate application for data collection may be bundled with the agent (e.g., either as an initial install with the agent or downloaded as a subsequent patch).

Thus, the systems and techniques described herein enable the discovery of information (e.g., MAC address, IP address, and the like) associated with devices that may previously have been invisible to network scanning tools such as a scan engine. This improved visibility into existing network devices can help network scanning tools provide a more complete view of a network environment. For example, those devices that are present in the network but are currently not being scanned may enable an unauthorized user (e.g., hacker) gain access to the network. By discovering these unscanned devices in the network and alerting a network administrator, the scan engine may be modified to scan the previously unscanned devices to increase security in the network and reduce the possibility of an unauthorized user gaining access to the network.

In the flow diagrams of FIGS. 2 and 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200 and 300 are described with reference to FIG. 1, as described above, although other models, frameworks, systems and environments may be used to implement these processes.

FIG. 2 is a flowchart of a process 200 that includes a client sending a request to a computing device to provide neighboring device data, according to some embodiments. The process 200 may be performed by an application executing on it client device, such as the scan engine 108 executing on the client 104 of FIG. 1.

At 202, the process may select the computing device from a plurality of computing devices. At 204, the process may send a request (e.g., via an API endpoint) to provide neighboring device data to a software agent executing on the computing device. At 206, the process may receive a result (e.g., data associated with devices neighboring the computing device) from the software agent. For example, in FIG. 1, the scan engine 108 selects one of the computing devices 102, such as the computing device 102(N), and sends the request 120 to the software agent 126 executing on the computing device 102(N). The scan engine 108 may request that the software agent 126 provide data regarding the neighboring devices 144(N) to the computing device 102 (N). After sending the request 120, the scan engine 108 receives the response 122 from the software agent 126. The response 120 to include the neighboring device data 142 associated with the neighboring devices 144(N).

At 208, the process may determine whether the data is present in a database (e.g., on the client device). If the process determines, at 208, that "yes" the data is present in the database, then the process may not store the data in the database, at 210, and proceed to 214. If the process determines, at 208 that "no" the data is not present in the database, then the process may store the data in the database, at 212, and proceed to 214. For example, in FIG. 1, the scan engine 108 may determine whether the neighboring device data 142 is included in the database 109. If the neighboring device data 142 is not included in the database 109, then the scan engine 108 may add the neighboring device data 142 to the database 109. The neighboring device data 142 may include the first identifier 134 (e.g., a hardware address, such as a MAC address) and the second identifier 136 (e.g., a software address, such as an IP address) associated with each neighboring device. The identifiers 134, 136 may be used to uniquely identify each neighboring device. In some cases, the scan engine 108 may associate the first identifier 134 and the second identifier 136 with a source identifier 138 that identifies the source of the neighboring device data, e.g., the computing device 102(N). If the neighboring device data is already included in the database 109, then the scan engine may not add the neighboring device data 142 to the database 109.

At 214, the process may determine whether each computing device of the plurality of computing devices has been sent a request. If the process determines, at 214 that "no", each computing device has not been sent a request, then the process may proceed to 202 to select a next computing device from the plurality of computing devices. In this way, the process may repeat 202, 204, 206, 208, 210 or 212, and 214 until each computing devices of the plurality of computing devices have been sent a request. If the process determines at 214 that "yes", each computing device of the plurality of computing devices has been sent a request, then the process may proceed to 216. The scan engine 108 may determine whether the request 120 has been sent to each of the computing devices 102. If the scan engine 108 determines that the request 120 has not been sent to each of the computing devices 102, then the scan engine 108 may select a next computing device of the computing devices 102, and sends the next computing device the request 120. If the scan engine 108 determines that the request 120 has been sent to each of the computing devices 102, then the scan engine 108 may determine the network representation 140.

At 216, the process may determine a representation of a network topology of network that includes the plurality of computing devices based on the data in the database. At 218, the process may determine whether to include the neighboring devices in the scans. For example, in FIG. 1, the scan engine 108 may use the information stored in the database 109 to create the network representation 140. For example, the network representation 140 may include a topology of the network that includes the computing devices 102. The scan engine 108 may provide information regarding the neighboring devices 144 that are currently not being scanned to a system administrator or the like. In some cases, the system administrator may instruct the scan engine 108 to scan at least a portion of the neighboring devices 144 to reduce the possibility of unauthorized access to the network through one of the neighboring devices 144.

Thus, a scan engine may request neighboring device data from a software agent installed on each computing device that the scan engine is scanning. The software agent may send the neighboring device data, such as a hardware identifier (e.g., MAC address) and a software identifier (IP address), to the scan engine. Using the neighboring device data, the scan engine may create a network representation that includes the currently scanned and the unscanned computing devices and send the network representation to a system administrator. The system administrator may, in some cases, instruct the scan engine to scan at least a portion of the currently unscanned computing devices to increase network security and reduce the number of unscanned computing devices to reduce the possibility of unauthorized access to the network via one of the un-scanned computing devices. In this way, the scan engine may improve the security of the network by identifying the neighboring devices that are currently not being scanned by the scan engine.

FIG. 3 is a flowchart of a process 300 that includes a computing device receiving a request from a client to provide neighboring device data, according to some embodiments. For example, the process 300 may be performed an application, such as the software agent 126, executing on each of the computing devices 102 of FIG. 1.

At 302, the process may receive, via an API endpoint, a request to provide neighboring device data. For example, in FIG. 1, the software agent 126 may receive, via the API endpoint 130, the request 120 to provide neighboring device data.

At 304, the process may read cache data associated with a command (e.g., ARP, NDP, or similar command to provide information about neighboring devices). At 306, the process may determine device data (e.g., MAC address, IP address, and the like) of neighboring devices from the cached data. At 308, the process may convert the device data into a standardized format to create neighboring device data. For example, in FIG. 1, the software agent 126 may read the cached data 128 associated with the commands 129, identify the device data associated with the devices 146 in the cached data 128, and standardize a format of the device data (e.g., MAC address, IP address, or the like) to create the neighboring device data 142.

At 310, the process may send the neighboring device data as a response to the request. For example, in FIG. 1, the software agent 126 may send the neighboring device data 142 in the response 122 to the scan engine 108.

Thus, a scan engine may request neighboring device data from a software agent installed on each computing device that the scan engine is scanning. The software agent may determine the neighboring device data, such as a hardware identifier (e.g., MAC address) and a software identifier (IP address), using a cache of an operating system command, such as ARP, NDP, or the like. Because each operating system may use a different format for the data included in the cache, the software agent may standardize the format of the neighboring device data prior to sending the neighboring device data to the scan engine.

Figure 4:
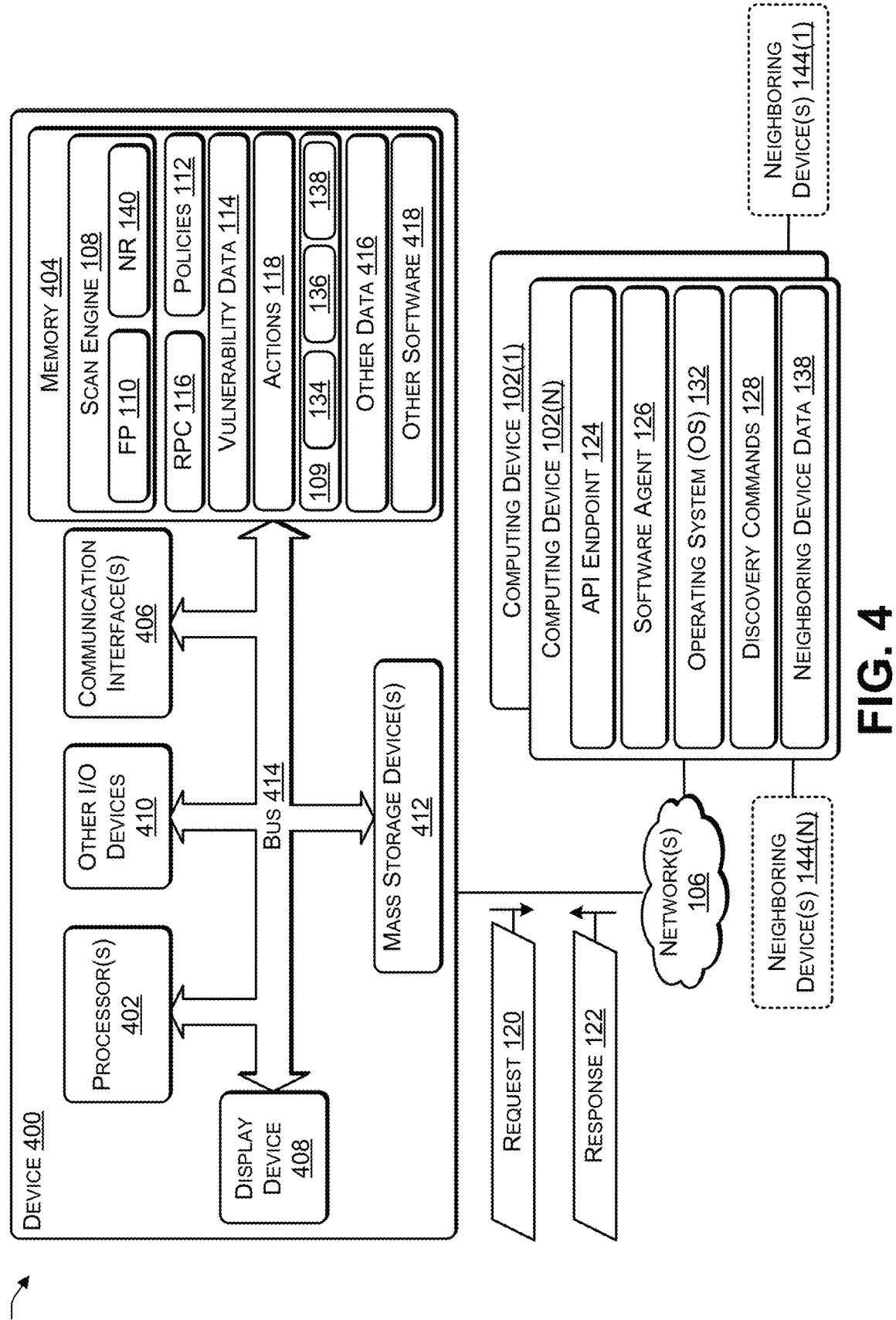
FIG. 4 illustrates an example configuration of a computing device that can be used to implement the systems and techniques described herein.

FIG. 4 illustrates an example configuration of a computing device 400 that can be used to implement the systems and techniques described herein, such as for example, the computing devices 102 of FIG. 1, the client 104, or both. For illustration purposes, the computing device 400 is illustrated in FIG. 4 as implementing the client 104 of FIG. 1.

The computing device 100 may include one or more processors 402 (e.g., central processing unit (CPU), graphics processing unit (GPU), or the like), a memory 404, communication interfaces 406, a display device 408, other input/output (I/O) devices 410 (e.g., keyboard, trackball, and the like), and one or more mass storage devices 412 (e.g., disk drive, solid state disk drive, or the like), configured to communicate with each other, such as via one or more system buses 414 or other suitable connections. While a single system bus 414 is illustrated for case of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 402 are one or more hardware devices that may include a single processing unit or a number of processing units, all of which may include single or multiple computing units or multiple cores. The processors 402 may include a graphics processing unit (GPU) that is integrated into the CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 may be configured to fetch and execute computer-readable instructions stored in the memory 404, mass storage devices 412, or other non-transitory computer-readable media.

Memory 404 and mass storage devices 412 are examples of non-transitory computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein and include any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network 106. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth.

The computer storage media, such as memory 404 and mass storage devices 412, may be used to store software and data. For example, the computer storage media may be used to store on or more applications, such as the scan engine 108, the RPC 116, the policies 112, the vulnerability data 114, the actions 118, the database 109, other data 416, and other software 418.

The systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:

executing a software agent on a computing device in a network, the execution comprising:

receiving a request from a scan engine to provide data associated with the computing device;

accessing an Address Resolution Protocol (ARP) cache or a Neighbor Discovery Protocol (NDP) cache maintained on the computing device to obtain a list of neighboring devices of the computing device in the network, wherein the scan engine is not able to directly scan a neighboring device in the list; and sending, by the software agent, device data about the neighboring device to the scan engine.

2. The method of claim 1, further comprising the software agent:

converting the device data into a standardized format that is a same format for a plurality of different operating systems.

3. The method of claim 1, wherein the device data includes an internet protocol (IP) address and a media access control (MAC) address of the neighboring device.

4. The method of claim 1, wherein the computing device implements an application programming interface (API) endpoint for a remote procedure call (RPC) from the scan engine, and the request is received at the API endpoint.

5. The method of claim 1, wherein the neighboring device implements a firewall that is configured to (a) not respond to network scans from the scan engine or (b) prevent the network scans from reaching one or more other computing devices in the network.

6. The method of claim 1, wherein the computing device is a virtual machine.

7. The method of claim 1, wherein the network is a wide area network (WAN).

8. The method of claim 1, wherein the software agent is configured to collect fingerprints of software on the computing device according to instructions from the scan engine.

9. The method of claim 1, wherein the software agent is configured to receive an operating system script from the scan engine and execute the script on the computing device.

10. The method of claim 1, wherein the software agent is executed in one process on the computing device, and the software agent is configured to invoke another process on the computing device to collect the device data.

11. A system comprising: a computer device configured to execute a software agent, the software agent executable to:

receive a request from a scan engine to provide data associated with the computing device;

access an Address Resolution Protocol (ARP) cache or a Neighbor Discovery Protocol (NDP) cache maintained on the computing device to obtain a list of neighboring devices of the computing device in the network, wherein the scan engine is not able to directly scan a neighboring device in the list; and send, by the software agent, device data about the neighboring device to the scan engine.

12. The system of claim 11, wherein the software agent is executable to:

convert the device data into a standardized format that is a same format for a plurality of different operating systems.

13. The system of claim 11, wherein the device data includes an internet protocol (IP) address and a media access control (MAC) address of the neighboring device.

14. The system of claim 11, wherein the computing device implements an application programming interface (API) endpoint for a remote procedure call (RPC) from the scan engine, and the request is received at the API endpoint.

15. The system of claim 11, wherein the neighboring device implements a firewall that is configured to (a) not respond to network scans from the scan engine or (b) prevent the network scans from reaching one or more other computing devices in the network.

16. The system of claim 11, wherein the computing device is a virtual machine.

17. The system of claim 11, wherein the network is a wide area network (WAN).

18. The system of claim 11, wherein the software agent is executable to receive a software patch from the scan engine.

19. The system of claim 11, wherein the software agent is executable to receive an operating system script from the scan engine and execute the script on the computing device.

20. The system of claim 11, wherein the software agent is executed in one process on the computing device, and the software agent is executable to invoke another process on the computing device to collect the device data.

* * * * *